(12) United States Patent
Sano

(10) Patent No.: US 8,564,169 B2
(45) Date of Patent: Oct. 22, 2013

(54) ELECTROSTATIC INDUCTION GENERATION DEVICE AND ELECTROSTATIC INDUCTION GENERATION APPARATUS HAVING A MOVABLE ELECTRODE FORMED BETWEEN A FIRST FIXED ELECTRODE SUBSTRATE AND A SECOND FIXED ELECTRODE SUBSTRATE

(75) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 129 days.

(21) Appl. No.: 13/214,538

(22) Filed: Aug. 22, 2011

(65) Prior Publication Data

US 2012/0043851 A1 Feb. 23, 2012

(30) Foreign Application Priority Data

Aug. 23, 2010 (JP) ................... 2010-185854

(51) Int. Cl.
*H02N 1/00* (2006.01)
(52) U.S. Cl.
USPC .......................................... 310/309; 322/2 A
(58) Field of Classification Search
CPC ........................................................ H01N 1/00
USPC ............. 310/309; 200/181; 361/207; 322/2 A
See application file for complete search history.

(56) References Cited

U.S. PATENT DOCUMENTS

| | | | | |
|---|---|---|---|---|
| 5,278,368 A | * | 1/1994 | Kasano et al. ................ | 200/181 |
| 7,126,249 B2 | * | 10/2006 | Shimanouchi ................ | 310/309 |
| 8,283,834 B2 | * | 10/2012 | Matsubara et al. ........... | 310/309 |
| 8,288,917 B2 | * | 10/2012 | Nakatsuka et al. ........... | 310/309 |
| 2008/0296984 A1 | | 12/2008 | Honma et al. | |
| 2010/0072855 A1 | | 3/2010 | Matsubara et al. | |
| 2010/0163376 A1 | * | 7/2010 | Yoon et al. .................... | 200/181 |
| 2011/0062820 A1 | * | 3/2011 | Aoyagi et al. ................ | 310/300 |

FOREIGN PATENT DOCUMENTS

| | | |
|---|---|---|
| JP | 58-029379 | 2/1983 |
| JP | 63-028280 | 2/1988 |
| JP | 2009-011149 | 1/2009 |
| JP | 2009-148124 | 7/2009 |
| JP | 2009-171821 | 7/2009 |
| JP | 4338745 | 7/2009 |
| JP | 2009-232667 | 10/2009 |

(Continued)

OTHER PUBLICATIONS

Hsi-wen Lo et al., A Simple Micro Electret Power Generator, IEEE, Jan. 21-25, 2007.*

(Continued)

*Primary Examiner* — Tran Nguyen
*Assistant Examiner* — Thomas Truong
(74) *Attorney, Agent, or Firm* — Harness, Dickey & Pierce, P.L.C.

(57) ABSTRACT

An electrostatic induction generation device comprising a first fixed electrode substrate having a first electret electrode, a second fixed electrode substrate having a second electret electrode, a movable electrode substrate having a movable electrode, a holding frame formed separately from the movable electrode, a first pair of electrode support beams and a second pair of electrode support beams connected with the movable electrode and the holding frame, and wherein the movable electrode substrate is formed between the first fixed electrode substrate and the second fixed electrode substrate, and the movable electrode is opposed to the first electret electrode and the second electret electrode.

6 Claims, 8 Drawing Sheets

(56) References Cited

FOREIGN PATENT DOCUMENTS

| | | |
|---|---|---|
| JP | 2010-041813 | 2/2010 |
| JP | 2010-068643 | 3/2010 |
| JP | 2010-081724 | 4/2010 |
| JP | 2010-115062 | 5/2010 |
| WO | 2008-026407 | 3/2008 |

OTHER PUBLICATIONS

S.W. Liu et al., Sandwich Structured Electrostatic/Electrets Parallel-Plate Power Generator for Low Acceleration and Low Frequency Vibration Energy Harvesting, IEEE, Jan. 29-Feb. 2, 2012.*

* cited by examiner

ELECTROSTATIC INDUCTION GENERATION DEVICE AND ELECTROSTATIC INDUCTION GENERATION APPARATUS HAVING A MOVABLE ELECTRODE FORMED BETWEEN A FIRST FIXED ELECTRODE SUBSTRATE AND A SECOND FIXED ELECTRODE SUBSTRATE

BACKGROUND

1. Technical Field

The present invention relates to an electrostatic induction generation device and an electrostatic induction generation apparatus.

2. Related Art

In accordance with the recent environmental concerns, electrical power generation using natural energy such as electrical power generation using solar energy or wind energy has been starting to spread widely. However, both of the solar energy and the wind energy must depend on the conditions for installation, namely the environment such that the sunlight is not blocked or that the stable wind is blowing. In contrast thereto, a method of converting the environmental vibration into electrical power attracts attention. As such a method, those using electromagnetic induction or piezoelectricity can be cited, and in particular, the electrostatic method using electromagnetic induction is a technology capable of downsizing and cost reduction with a simple structure.

The principle of the electrical power generation using the electrostatic method is as follows. A substrate provided with an electret semipermanently holding surface electric charge is used as one substrate. The other substrate opposed to the one substrate is provided with an electrode. Then the substrates are moved so as to make a relative movement (displacement) to thereby vary the area of the electrode opposed to the electret. The variation in the dielectric charge caused in the electrode is taken out to thereby generate electricity (Japanese Patent No. 4,338,745 (Document 1)).

In the electrical power generation using the electrostatic method, the charge held by the electret and the dielectric charge generated on the opposed electrode cause the Coulomb force in the attracting direction to act between electrodes to thereby make the electrodes opposed to each other with a small gap have contact with each other, which hinders the relative displacement or causes displacement (behavior) in a direction different from the relative displacement direction to thereby make the efficient electrical power generation difficult. Therefore, there has been proposed an electrostatic induction generation provided with a guard and a stopper for limiting the relative displacement (WO 08/026407 brochure (Document 2)).

However, even in the device of Document 2, the contact between the guard and the electrode hinders the normal relative displacement between the electrodes to thereby make the electrical power generation unstable.

SUMMARY

An advantage of some aspects of the invention is to provide an electrostatic induction generation device and an electrostatic induction generation apparatus each stabilizing the relative displacement of the electrodes to thereby efficiently supply the stable electrical power.

APPLICATION EXAMPLE 1

This application example of the invention is directed to an electrostatic induction generation device including a first fixed electrode substrate and a second fixed electrode substrate each having an electret electrode on one surface, and a movable electrode substrate having at least one movable electrode, a holding frame formed separately from the movable electrode, and at least one pair of electrode support beams adapted to couple two sides of the movable electrode opposed to each other to the holding frame in a direction perpendicular to a movable direction of the movable electrode, wherein the electret electrode of the first fixed electrode substrate and the electret electrode of the second fixed electrode substrate are disposed so as to be opposed to each other, the movable electrode and the electret electrode of each of the first fixed electrode substrate and the second fixed electrode substrate are disposed so as to be opposed to each other, and the movable electrode substrate is sandwiched between and partially fixed to the first fixed electrode substrate and the second fixed electrode substrate.

According to this application example of the invention, since the at least one pair of electrode support beams disposed in a direction perpendicular to the movable direction of the movable electrode provided to the movable electrode substrate prevents the behavior of the movable electrode in other directions than the movable direction thereof, the electrical power generation efficiency is not degraded. Further, since the movable electrode substrate is sandwiched by the first fixed electrode substrate and the second fixed electrode substrate each provided with the electret electrode while disposing the electret electrodes disposed so as to be opposed to each other, the amount of charge electrostatically induced in the movable electrode can be increased, and thus the electricity to be generated can be increased.

APPLICATION EXAMPLE 2

This application example of the invention is directed to the electrostatic induction generation device of the above application example of the invention, wherein each of the electrode support beams has a beam length L defined as a distance from a connection point of the movable electrode to a connection point of the holding frame, a beam width W in a direction perpendicular to the beam length L in a plan view, and a beam thickness T, the beam length L, the beam width W, and the beam thickness T fulfilling the following relationship.

$$W/T \leq 0.1$$

According to this above application example of the invention, the displacement in the direction perpendicular to the vibration direction of the movable electrode can be prevented. Therefore, the highly efficient electrostatic induction generation device with a small conversion loss from the vibration applied thereto to the electricity can be obtained.

APPLICATION EXAMPLE 3

This above application example of the invention is directed to the electrostatic induction generation device of the above application example of the invention, wherein the movable electrode is formed to have a plurality of electrode fingers extending in a direction perpendicular to the movable direction of the movable electrode, and an electrode finger beam connected to both ends of the electrode fingers, each of the electrode support beams extends from the electrode finger beam, and the electret electrode of each of the first fixed electrode substrate and the second fixed electrode substrate is formed to have a plurality of electret electrode fingers opposed respectively to the plurality of electrode fingers of the movable electrode.

According to this application example of the invention, it becomes possible to increase the amount of the variation in the overlap in a plan view between the electret electrode fingers and the electrode fingers of the movable electrode within the amplitude of the vibration applied thereto, and thus the electricity generated can be increased.

APPLICATION EXAMPLE 4

This application example of the invention is directed to the electrostatic induction generation device of the above application example of the invention, wherein at least two of the movable electrodes are provided, and the at least two movable electrodes are disposed so that the respective movable directions are perpendicular to each other.

According to this application example of the invention, it is possible to obtain the electrostatic induction generation device capable of generating electrical power irrespective of the direction of the vibration applied thereto.

APPLICATION EXAMPLE 5

This application example of the invention is directed to an electrostatic induction generation apparatus using the electrostatic induction generation device according to the above application example of the invention.

According to this application example of the invention, the electrostatic induction generation apparatus capable of efficiently converting the vibration applied from the outside into the electricity to thereby generate electrical power can be obtained.

BRIEF DESCRIPTION OF THE DRAWINGS

The invention will be described with reference to the accompanying drawings, wherein like numbers reference like elements.

FIGS. 4A and 4B are cross-sectional views of the electrostatic induction generation device according to the first embodiment, wherein FIG. 4A is a cross-sectional view of the B-B' part shown in FIG. 2, and FIG. 4B shows the C-C' part shown therein.

FIGS. 5A through 5D are diagrams for explaining the electrostatic induction generation device according to the first embodiment, wherein FIG. 5A is a schematic plan view of a third substrate, FIG. 5B is a conceptual diagram of a cross-section of the D plane shown in FIG. 1, and FIGS. 5C and 5D are enlarged conceptual diagrams of the E part indicated in FIG. 5B for explaining electrostatic induction.

FIGS. 7A and 7B are partial enlarged views of the electrode support beam of the electrostatic induction generation device according to the first embodiment, wherein FIG. 7A is a plan view, and FIG. 7B is a cross-sectional view of the F-F' part indicated in FIG. 7A.

DESCRIPTION OF EXEMPLARY EMBODIMENTS

Some embodiments according to the invention will hereinafter be explained with reference to the accompanying drawings.

First Embodiment

Figure 1:
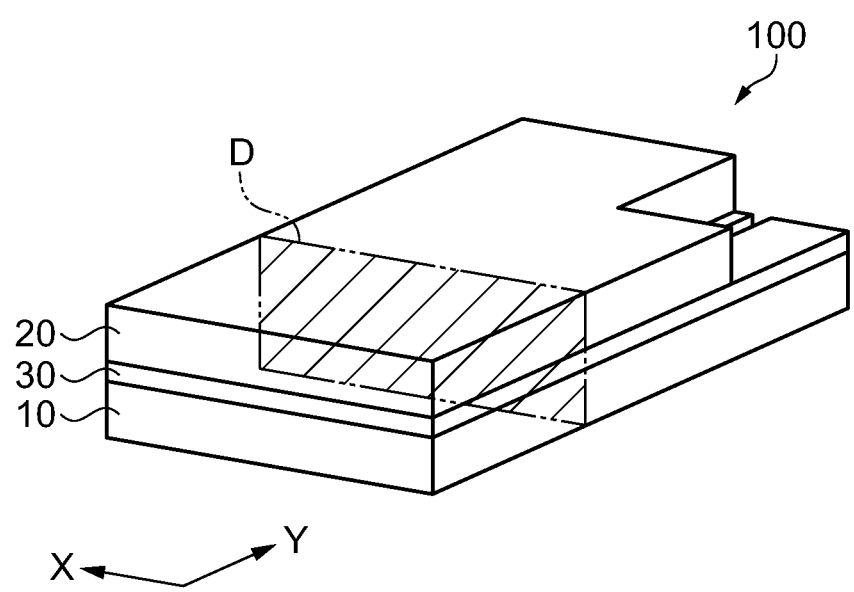
FIG. 1 is an external perspective view of an electrostatic induction generation device according to a first embodiment of the invention.

FIG. 1 is an external perspective view showing the electrostatic induction generation device according to the present embodiment. The electrostatic induction generation device 100 shown in FIG. 1 is composed of a first substrate 10 as a first fixed electrode substrate provided with an electret on the fixed electrode described later, a movable substrate 30 provided with a movable section, and a second substrate 20 as a second fixed electrode substrate provided with the electret on the fixed electrode, stacked so that the first substrate 10 and the second substrate 20 sandwich the movable substrate 30.

Figure 2:
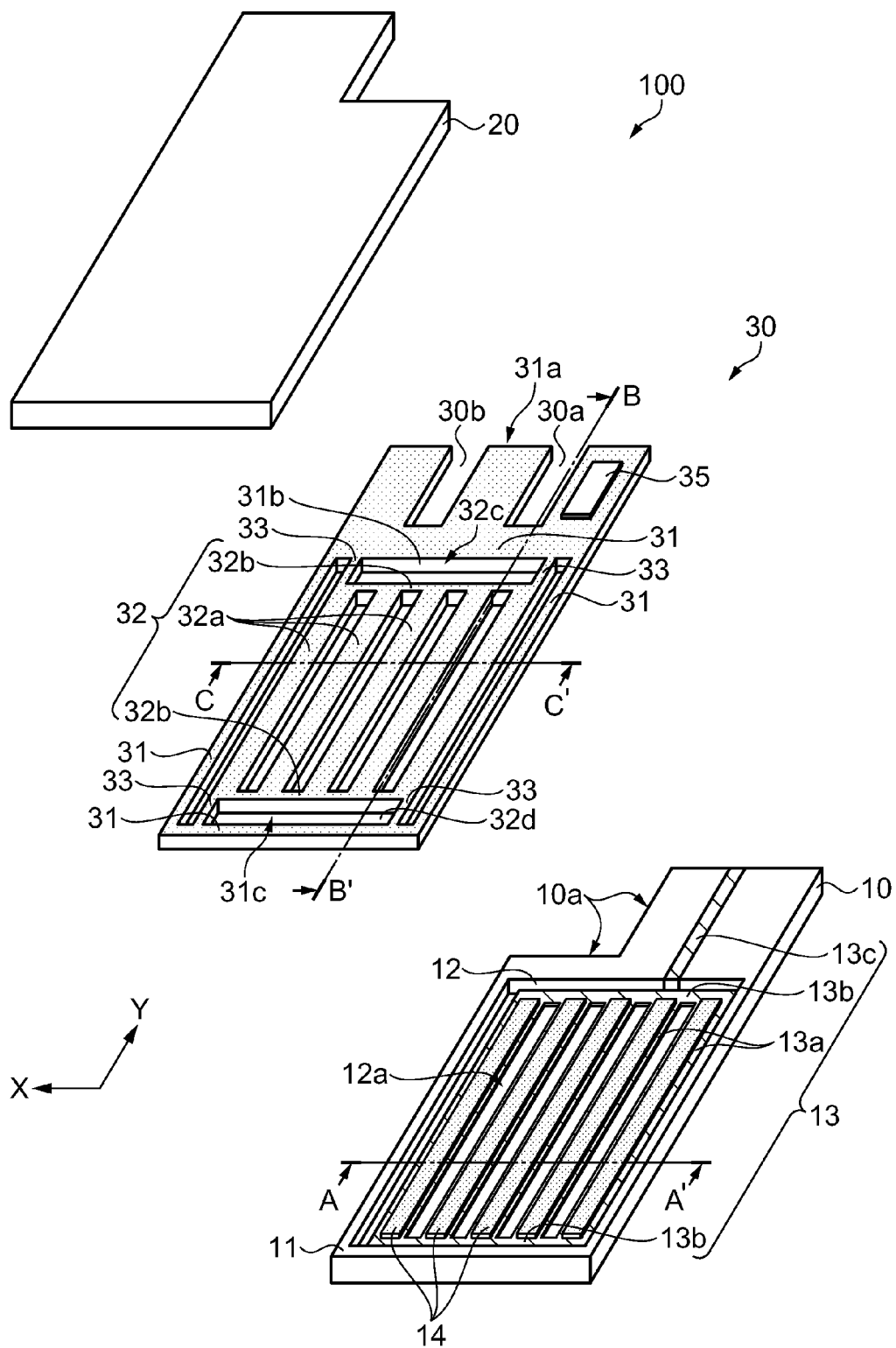
FIG. 2 is an external perspective view of the electrostatic induction generation device according to the first embodiment in an exploded state.

FIG. 2 is an external perspective view of the electrostatic induction generation device 100 shown in FIG. 1 in an exploded state. The first substrate 10 is a glass substrate, and borosilicate glass, for example, is preferably used therefor. One surface 11 (hereinafter referred to as an electrode forming surface 11) of the first substrate 10 is provided with a recess 12, and a fixed electrode 13 formed of a metal film made of, for example, Au, Pt, Ag, Ti or W is formed on a bottom surface 12a of the recess 12. The fixed electrode includes a plurality of fixed electrode fingers 13a extending in the Y direction indicated in the drawings at predetermined intervals. Further, at least one connection electrode 13b for connecting both or either one of the ends of the fixed electrode fingers 13a is formed so as to extend in a direction (X direction) perpendicular to the fixed electrode fingers 13a, and further, an external connection electrode 13c formed on the electrode forming surface 11 and the connection electrode 13b are connected to each other.

The first substrate 10 has a roughly rectangular outer shape, and is partially provided with a notch 10a. The notch 10a is for exposing an external connection terminal provided to the movable substrate 30 described later. The second substrate 20 is formed to have a configuration common to the first substrate 10 configured as described above, and the constituents identical to the recess 12 and the fixed electrode 13 formed on the electrode forming surface 11 of the first substrate 10 are provided to the surface opposed to the movable substrate 30 although not shown in the drawings.

Figure 3:
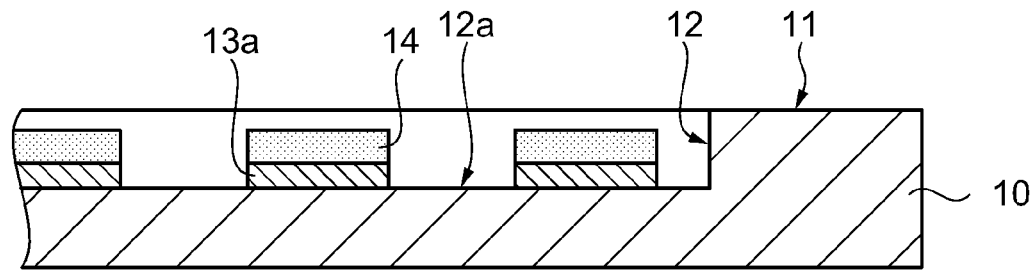
FIG. 3 is a cross-sectional view the A-A' part of the electrostatic induction generation device according to the first embodiment shown in FIG. 2.

FIG. 3 is an enlarged cross-sectional view of the first substrate 10 shown in FIG. 2 viewed along the A-A' direction. The fixed electrode fingers 13a formed on the first substrate 10 are each further provided with an electret electrode finger 14. The electret electrode finger 14 always holds the charge on the surface, and can be formed using a known method. The electret electrode finger 14 is formed on each of the fixed electrode fingers 13a extending in the Y direction, and is not provided to a region other than the surface of each of the fixed electrode fingers 13a. It should be noted that the electret electrode finger 14 can also be formed on the connection electrode 13b extending in the X direction perpendicular to the fixed electrode fingers 13a.

The movable substrate 30 will be explained. The movable substrate 30 is formed of a single-crystal silicon substrate, and the outer shape thereof is formed to have a roughly rectangular shape. A movable electrode holding frame 31 is formed to have a frame-like shape along the outer shape, and an outer shape portion of one side 31a of the movable electrode holding frame 31 is provided with a notch 30a formed at a position corresponding to the external connection electrode 13c of the first substrate 10, and a notch 30b formed at a position corresponding to the external connection electrode, not shown, of the second substrate 20.

Figure 4A:
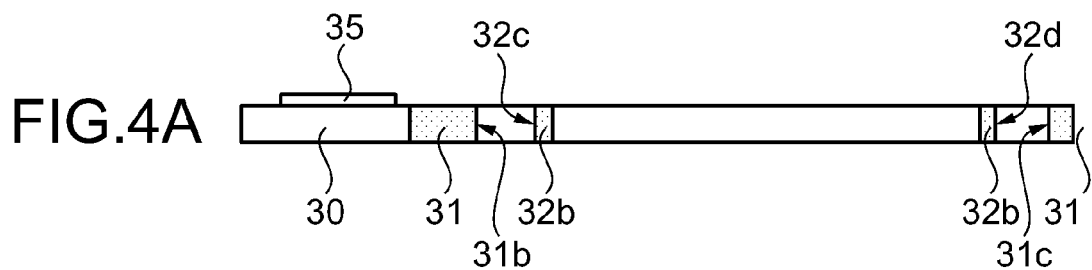
Figure 4B:
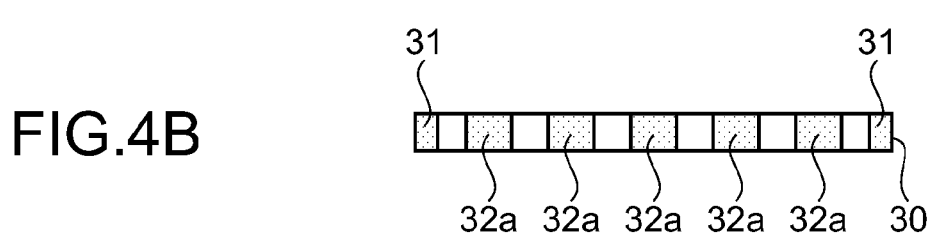

FIG. 4A is a cross-sectional view of the movable substrate 30 along the B-B' direction indicated in FIG. 2, and FIG. 4B is a cross-sectional view thereof along the C-C' direction. Inside the movable electrode holding frame 31, there is formed a movable electrode 32 having a rectangular outer shape separately from the movable electrode holding frame 31. The movable electrode 32 is provided with a plurality of movable electrode fingers 32a extending in the Y direction shown in the drawings, and electrode finger beams 32b coupled to both ends of the movable electrode fingers 32a and extending in the direction (the X direction) perpendicular to the movable electrode fingers 32a. In the present embodiment, the movable electrode 32 vibrates (moves) in the direction (the X direction) perpendicular to the extending direction of the movable electrode fingers 32a, and the electrical power is generated by the variation in the opposed area with respect to the electret electrode fingers 14 provided to the first substrate 10 described above disposed so as to be opposed to the movable electrode fingers 32a and the electret electrode fingers, not shown, provided to the second substrate 20. It should be noted that although the explanation is presented using the plurality of movable electrode fingers 32a in the above description, it is also possible to adopt the configuration of the single movable electrode finger 32a, namely using the flat plate of the movable electrode 32 as the electrode finger.

At least one pair of (two) electrode support beams 33 linking outer sides 32c, 32d of the movable electrode 32 parallel to the vibration direction of the movable electrode 32 respectively to inner sides 31b, 31c of the movable electrode holding frame 31 opposed to the outer sides 32c, 32d of the movable electrode 32 are provided to each of the outer sides 32c, 32d. In other words, the movable electrode holding frame 31 holds the movable electrode 32 using the electrode support beams 33.

Further, an external connection section 35 is disposed on both or either one of the substrate surfaces of the movable substrate 30 at a position corresponding to the notch 10a of the first substrate 10 or the notch of the second substrate 20. The external connection section 35 is a metal film, namely a thin film made of metal such as Au, Pt, Ag, Ti, or W, formed by, for example, an evaporation process or a sputtering process, and is used as a connection terminal with a circuit board or the like.

The first substrate 10, the movable substrate 30, and the second substrate 20 described above are sequentially stacked, and then bonded to each other airtightly via the bonding sections of the respective substrates, namely the movable electrode holding frame 31 of the movable substrate 30, and thus the electrostatic induction generation device 100 can be obtained. As the bonding process, an anodic bonding process known to the public, for example, is preferably used. Further, since the inside of the electrostatic induction generation device 100 is sealed in vacuo, there is no chance that the motion of the movable electrode 32 is hindered by a gas such as air.

Figures 5A, 5B:
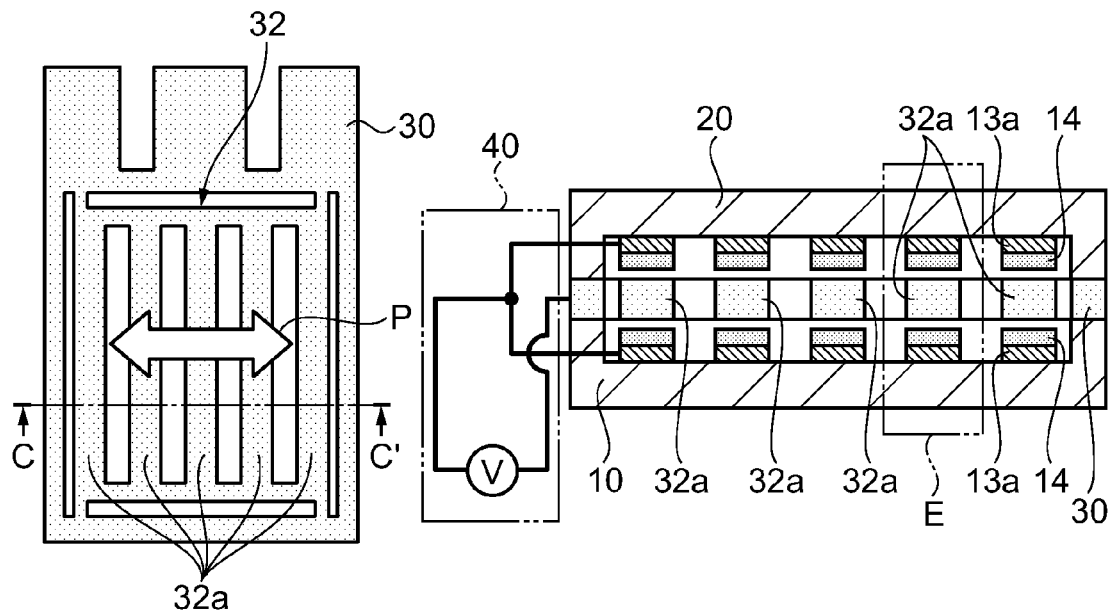
Figures 5C, 5D:
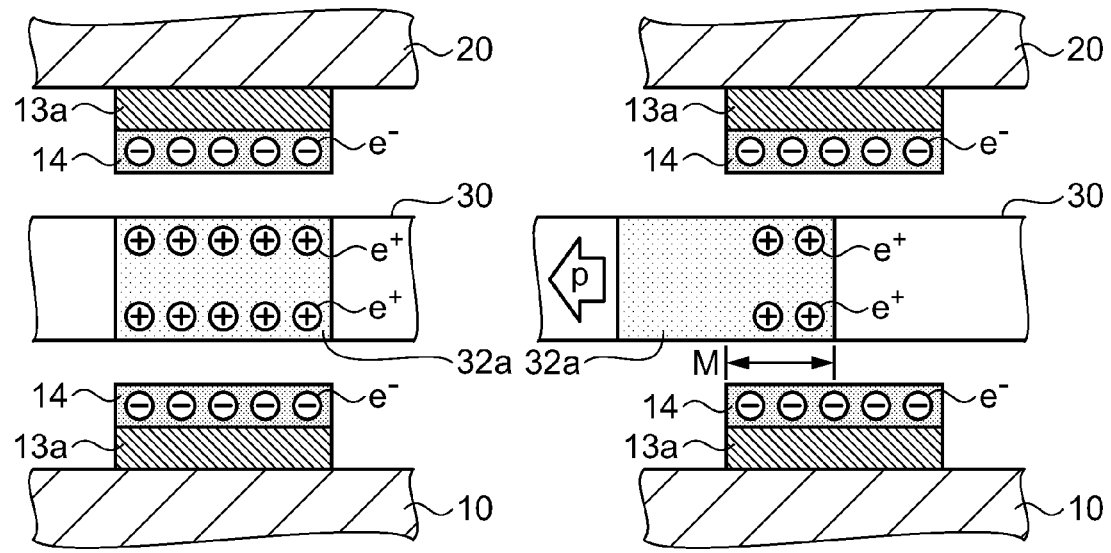

The operation of the electrostatic induction generation device 100 according to the present embodiment will be explained. FIGS. 5A through 5D are conceptual diagrams for explaining the operation of the electrostatic induction generation device 100, wherein FIG. 5A is a schematic plan view of the movable substrate 30, FIG. 5B is a cross-sectional view of the D plane of the electrostatic induction generation device 100 shown in FIG. 1 including the C-C' cross-section of the movable substrate 30, and FIGS. 5C and 5D are enlarged views of the E part shown in FIG. 5B.

As shown in FIG. 5A, the electrostatic induction generation device 100 according to the present embodiment generates the electrical power using the migration of the charge caused by the vibration of the movable electrode 32 of the movable substrate 30 in the P direction shown in the drawing. As shown in FIG. 5B, the first substrate 10 and the second substrate 20 are each provided with the fixed electrode fingers 13a and the electret electrode fingers 14 formed on the surface of the respective fixed electrode fingers 13a disposed so as to be opposed to the respective movable electrode fingers 32a constituting the movable electrode 32 of the movable substrate 30. In the resting condition of the movable electrode 32 shown in FIG. 5B, the charge is always held on the surface of the electret electrode fingers 14 as shown in FIG. 5C. Although in the present embodiment, the explanation is presented using the example of holding the negative charge on the surface of the electret electrode fingers 14, the electret holding the positive charge can also be adopted. On that occasion, the negative charge is induced to and then held by the movable electrode fingers 32a.

Due to the negative charge $e^-$ held on the surface of the electret electrode fingers 14, the positive charge $e^+$ is charged on the surface of the movable electrode fingers 32a of the movable electrode 32 by the electrostatic induction. In the present condition, if the movable electrode is displaced in the p direction due to the vibration as shown in FIG. 5D, the overlap M in a plan view between the movable electrode finger 32a and the electret electrode finger 14 is reduced, and some of the positive charge $e^+$ having been held by the movable electrode finger 32a migrates to a power supply device 40 shown in FIG. 5B, namely the electrical power generation occurs.

Due to the vibration of the movable electrode 32 described above, the electrical power is generated by repeating the process of taking the positive charge e+ on the movable electrode finger 32e by the electrostatic induction in the condition shown in FIG. 5C, then displacing the movable electrode 32 toward the p direction shown in FIG. 5D to thereby discharge the charge, returning to the condition of FIG. 5C to take the positive charge e+, then moving the movable electrode 32 toward the opposite direction to the p direction shown in FIG. 5D in the condition not shown to thereby discharge the charge, and then returning to the condition shown in FIG. 5C.

Figure 6A:
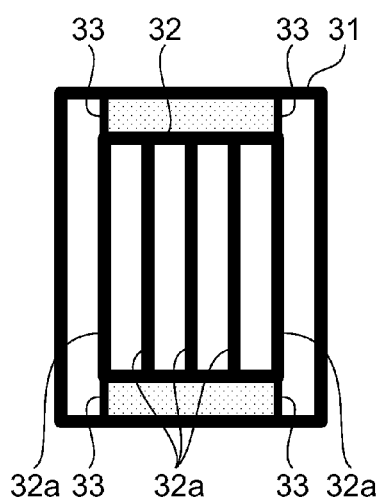
FIGS. 6A through 6C are conceptual diagrams for explaining the operation of electrode support beams of the electrostatic induction generation device according to the first embodiment.
Figure 6B:
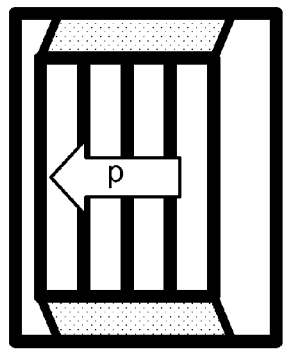
Figure 6C:
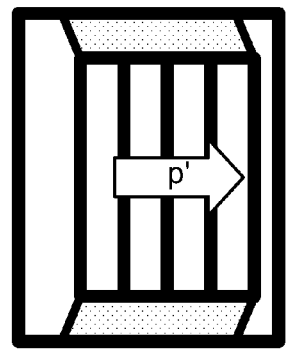

In order for vibrating the movable electrode 32 in a stable state, there are provided the electrode support beams 33 linking the movable electrode holding frame 31 and the movable electrode 32 to each other. FIGS. 6A through 6C are conceptual diagrams schematically showing the movable substrate 30. The behavior of the electrode support beams 33 will be explained with reference to FIGS. 6A through 6C. FIG. 6A shows the position of the movable electrode 32 in a stopped state. In this state, if the vibration is applied to the electrostatic induction generation device 100, and thus the movable electrode 32 is displaced toward, for example, the arrow p direction shown in FIG. 6B, each of the rectangular sections (the hatched sections in the drawings) defined by the electrode support beams 33, the movable electrode 32, and the movable electrode holding frame 31 is deformed from a rectangular shown in FIG. 6A to a parallelogram shown in FIG. 6B. Further, in the case in which the movable electrode 32 is displaced toward the arrow p' direction shown in FIG. 6C, each of the rectangular sections is also deformed to a parallelogram. This means that the movable electrode 32 is accurately translated in the p direction and the p' direction, namely the vibration direction perpendicular to the extending direction of the movable electrode fingers 32a. In other words, the vibration in the p direction and the p' direction can accurately be performed, and no vibration component in other directions than the p direction and the p' direction is generated.

In the electrostatic induction generation device 100 according to the present embodiment, it becomes possible to surely prevent twist of the overlap in a plane view between the movable electrode fingers 32a and the electret electrode fingers 14, the twist being one of the causes of degradation in the power generation efficiency and generation of variation in the electricity generated, and thus the high-quality electrical power generation device can be obtained.

Figure 7A:
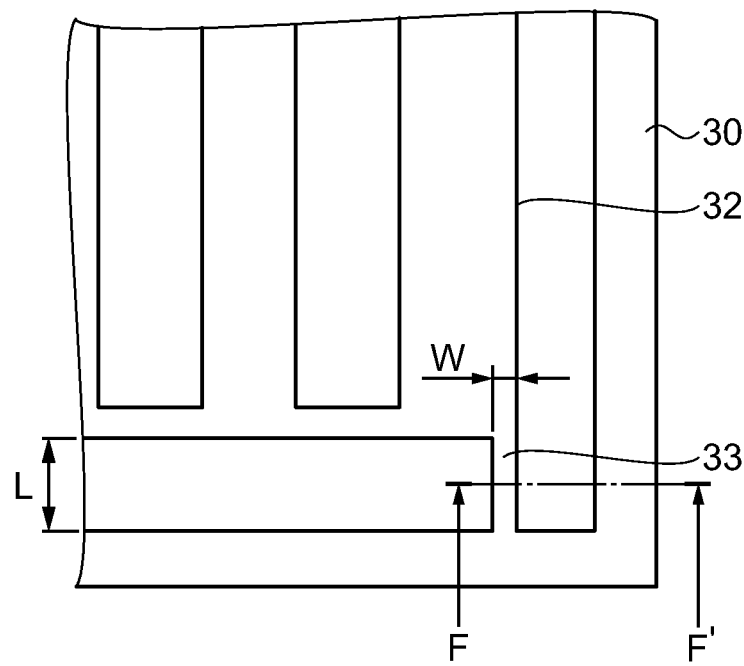
Figure 7B:
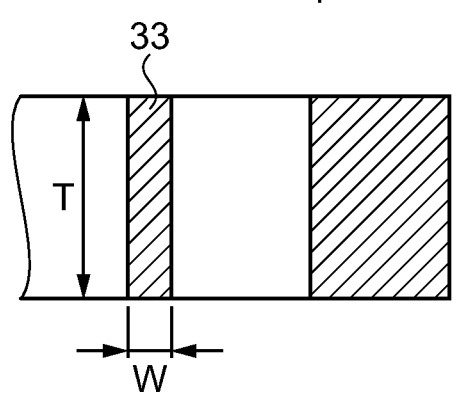

As described above, the electrode support beams 33 are for keeping the movable electrode 32 in the accurate vibration direction, and are set in the following conditions. FIGS. 7A and 7B are partial enlarged views of the electrode support beam 33, wherein FIG. 7A is a plan view, and FIG. 7B is a cross-sectional view of the F-F' part in FIG. 7A. It is assumed that the beam length of the electrode support beam 33 is L, the beam width thereof is W, and the beam thickness thereof is T.

The beam length L is determined based on design values of the resonant frequency at which the movable electrode 32 resonates with respect to the environmental vibration (an external vibration) applied to the movable electrode 32, and the amplitude of the vibration of the movable electrode 32. The beam length L for the movable electrode fingers 32a is designed based on the displacement amount with which the overlap M in the plan view can be provided even when the movable electrode 32 is displaced due to the vibration as explained with reference to FIG. 5D, namely the amplitude of the vibration at the resonant frequency.

In contrast thereto, the beam width W and the beam thickness T of the electrode support beam 33 are determined so as to reduce the vibration component (hereinafter referred to as a movable vertical component) in the perpendicular direction to the sheet of FIG. 5A showing the vibration direction P, namely in the thickness direction of the movable electrode 32 as much as possible. Here, the vibration component in the vibration direction P and the movable vertical component can be compared to each other using the spring constant $k_H$ (hereinafter referred to as a horizontal spring constant) of the electrode support beam 33 in the beam width W direction, and the spring constant $k_V$ (hereinafter referred to as a vertical spring constant) thereof in the beam thickness T direction.

The horizontal spring constant $k_H$ and the vertical spring constant $k_V$ are respectively obtained by the following formulas. It should be noted that the following formulas represent the composite spring constant of the four electrode support beams 33 provided to the electrostatic induction generation device 100 according to the present embodiment.

$$k_H = E \times T \times \left(\frac{T}{W}\right)^3 \quad (1)$$

$E$ : Young's modulus

-continued $$k_V = E \times W \times \left(\frac{T}{L}\right)^3 \quad (2)$$

$E$ : Young's modulus

According to the formulas 1, 2 described above, $k_V/k_H \leq 0.01$, namely setting the displacement amount of the movable vertical component with respect to the displacement amount of the electrode support beam 33 in the vibration direction P to 1% or lower is preferable. Therefore, it is preferable to fulfill the relationship of $W/T \leq 0.1$.

The beam length L can be obtained by the following formula based on the beam width W and the beam thickness T thus obtained, and the setting values of the resonant frequency and the amplitude of the movable electrode 32 described above.

$$L = \sqrt[3]{\frac{(E \times \alpha^3 \times T^4)}{k}} \quad (3)$$

$E$ : Young's modulus $\alpha = \frac{W}{T}$ $k$ : spring constant with respect
to a vibration of the movable electrode 32

$k = (2\pi f)^2 \times m$ $f$ : resonant frequency (natural frequency)

$m$ : mass of the movable electrode

Second Embodiment

Figure 8:
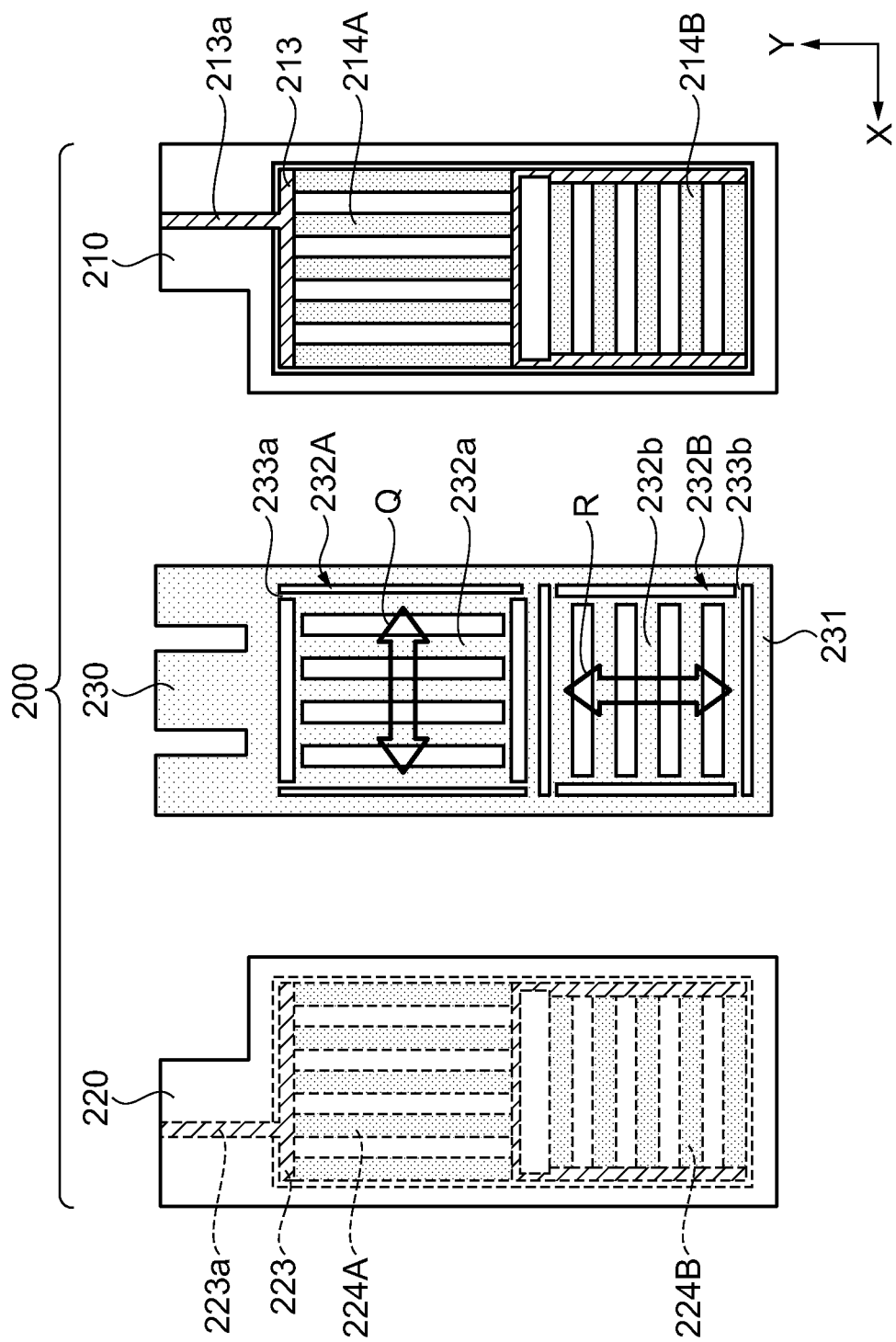
FIG. 8 is a schematic perspective view of an electrostatic induction generation device according to a second embodiment of the invention.

A second embodiment of the invention is shown in FIG. 8. Similarly to the first embodiment, the electrostatic induction generation device 200 shown in FIG. 8 is provided with a movable substrate 230, and a first substrate 210 and a second substrate 220 disposed so as to sandwich the movable substrate 230. The movable substrate 230 has a movable electrode holding frame 231 formed along the outer shape thereof to have a frame shape. A movable electrode 232A and a movable electrode 232B are coupled to the movable electrode holding frame 231 via electrode support beams 233a, 233b. The extending directions of the movable electrode fingers 232a, 232b provided to the respective movable electrodes 232A, 232B are perpendicular to each other. Specifically, in the drawing, the movable electrode fingers 232a are formed so as to extend in the Y direction, and the movable electrode fingers 232b are formed so as to extend in the X direction.

The first substrate 210 used for sandwiching the movable substrate 230 is provided with electret electrode fingers 214A, 214B disposed so as to opposed to the movable electrode fingers 232a of the movable electrode 232A provided to the movable substrate 230 and the movable electrode fingers 232b of the movable electrode 232B provided thereto, and the electret electrode fingers 214A, 214B are electrically connected to an external connection electrode 213a via a fixed electrode 213.

Similarly, the second substrate 220 is also provided with electret electrode fingers 224A, 224B disposed so as to opposed to the movable electrode fingers 232a of the movable electrode 232A provided to the movable substrate 230 and the movable electrode fingers 232b of the movable electrode 232B provided thereto, and the electret electrode fingers 224A, 224B are electrically connected to an external connection electrode 223a via a fixed electrode 223.

The first substrate 210, the movable substrate 230, and the second substrate 220 are stacked in the directions shown in FIG. 8 sequentially in the order of the first substrate 210, the movable substrate 230, and the second substrate 220, and then bonded airtightly via the movable electrode holding frame 231 of the movable substrate 230, and thus formed as the electrostatic induction generation device 200.

Since the electrostatic induction generation device 200 has the movable electrode fingers 232a, 232b extending respectively in the directions perpendicular to each other as shown in FIG. 8, the electrostatic induction generation is performed by the movable electrode 232A with respect to the vibration direction Q shown in the drawing, and the electrostatic induction generation is performed by the movable electrode 232B with respect to the vibration direction R shown in the drawing perpendicular to the vibration direction Q. Therefore, by using the electrostatic induction generation device 200 according to the present embodiment, even if the vibration in every direction in the horizontal direction of the movable substrate 230 is applied, the vibration is split into the vibration components in the respective vibration directions Q, P to thereby make the electrostatic induction generation possible. Therefore, the electrostatic induction generation device with high versatility capable of corresponding to various vibration directions can be obtained.

Third Embodiment

Figure 9:
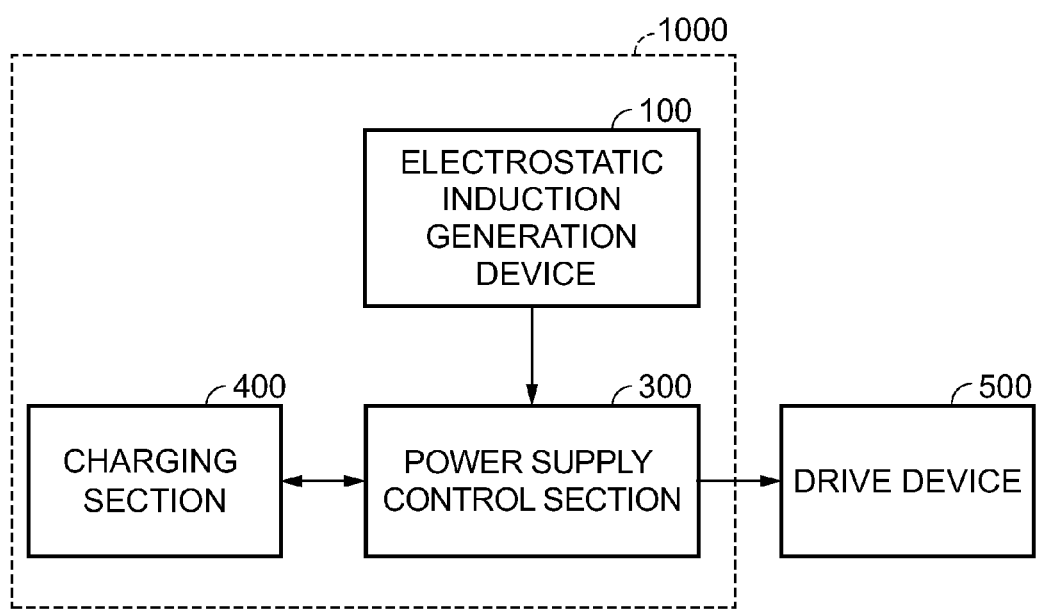
FIG. 9 is a block diagram showing an electrostatic induction generation apparatus according to a third embodiment of the invention.

As a third embodiment of the invention, an electrostatic induction generation apparatus using the electrostatic induction generation device according to the first embodiment will be explained. FIG. 9 is a block diagram showing the electrostatic induction generation apparatus 1000 according to the third embodiment of the invention. The electrostatic induction generation apparatus 1000 is provided with the electrostatic induction generation device 100, a power control section 300, and a charging section 400, and supplies the drive device 500 to be a drive object with the electricity thus generated.

The electricity generated by the electrostatic induction generation device 100 is taken out as an irregular current. The power control section 300 converts the irregular current into stable electricity, and then supplies the drive device 500 with the electricity. Further, if the supply of the electricity to the drive device 500 is not required, the power control section 300 supplies the charging section 400 with the electricity to thereby charge a rechargeable device not shown. In order for stably supplying the drive device 500 with the electricity, the electricity thus stored is used in the power control section 300 together with the electricity from the electrostatic induction generation device 100 for forming the stable electricity.

The drive device 500 is not particularly limited, but if, for example, an acceleration sensor is used as the drive device 500, the electrostatic induction generation apparatus according to the present embodiment can preferably be used as the drive power supply. Specifically, even in the case of installing the sensor in a remote place where the power is difficult to get, by providing the electrostatic induction generation apparatus 1000 resonating with the acceleration (vibration) range to be detected by the acceleration sensor, supply of the drive power to the sensor, power supply to a data transmitter for transmitting the detection result to a base station using wireless communication, and so on are made possible with a simple apparatus without requiring particular power supply installation work.

Specific Examples

As specific examples, the beam width W, the beam thickness T, and the beam length L shown in FIGS. 7A and 7B have been compared between the following levels.
Level 1: W=100 μm, T=100 μm
Level 2: W=10 μm, T=100 μm
Level 3: W=5 μm, T=100 μm
Level 4: W=1 μm, T=100 μm
In each of the levels, $k_V/k_H$ has been obtained as follows.
Level 1: $k_{V1}/k_{H1}=1.0$
Level 2: $k_{V2}/k_{H2}=0.01$
Level 3: $k_{V3}/k_{H3}=0.0025$
Level 4: $k_{V4}/k_{H4}=0.0001$
Therefore, it has turned up that the level 2 in which the displacement amount of the electrode support beam in the vertical direction with respect to that in the vibration direction is 1% or lower, namely W/T=0.1, is preferable. Further, the beam length L=1670 μm has been obtained.

The entire disclosure of Japanese Patent Application No. 2010-185854, filed Aug. 23, 2010 is expressly incorporated by reference herein.

What is claimed is:

1. An electrostatic induction generation device comprising:
    a first fixed electrode substrate having a first electret electrode, the first electret electrode having a first electret electrode finger and a second electret electrode finger;
    a second fixed electrode substrate having a second electret electrode, the second electret electrode having a third electret electrode finger and a fourth electret electrode finger; and
    a movable electrode substrate having:
        a movable electrode having a first side and a second side in a direction perpendicular to a movable direction of the movable electrode, the second side being opposed to the first side;
        a first electrode finger beam having the first side;
        a second electrode finger beam having the second side; and
        a first electrode finger and a second electrode finger that are formed from the first electrode finger beam to the second electrode finger beam;
        a holding frame formed separately from the movable electrode;
        a pair of electrode support beams connected with the movable electrode and the holding frame,
    wherein the movable electrode substrate is formed between the first fixed electrode substrate and the second fixed electrode substrate,
    the movable electrode is opposed to the first electret electrode and the second electret electrode,
    the first electrode finger is opposed to the first electret electrode finger and the third electret electrode finger, and
    the second electrode finger is opposed to the second electret electrode finger and the fourth electret electrode finger.

2. The electrostatic induction generation device according to claim 1, wherein
    each of the electrode support beams has a beam length L defined as a distance from a connection point of the movable electrode to a connection point of the holding frame, a beam width W in a direction perpendicular to the beam length L in a plan view, and a beam thickness T, and the beam width W, and the beam thickness T fulfills the following relationship $W/T \leq 0.1$.

3. An electrostatic induction generation apparatus comprising:
the electrostatic induction generation device according to claim 2.

4. An electrostatic induction generation apparatus comprising:
the electrostatic induction generation device according to claim 1.

5. An electrostatic induction generation apparatus comprising:
a first fixed electrode substrate and a second fixed electrode substrate each having an electret electrode on one surface; and
a movable electrode substrate having at least two movable electrodes, a holding frame formed separately from the movable electrode, and a pair of electrode support beams adapted to couple two sides of the movable electrode opposed to each other to the holding frame,
wherein the electret electrode of the first fixed electrode substrate and the electret electrode of the second fixed electrode substrate are disposed so as to be opposed to each other,
the movable electrode and the electret electrode of each of the first fixed electrode substrate and the second fixed electrode substrate are disposed so as to be opposed to each other,
the movable electrode substrate is formed between the first fixed electrode substrate and the second fixed electrode substrate, and
the at least two movable electrodes are disposed so that the movable directions are perpendicular to each other.

6. An electrostatic induction generation apparatus comprising:
the electrostatic induction generation device according to claim 5.

* * * * *